United States Patent
Ujiie et al.

(10) Patent No.: US 11,182,013 B2
(45) Date of Patent: Nov. 23, 2021

(54) DISPLAY DEVICE WITH TOUCH PANEL, AND OPERATION DETERMINATION METHOD THEREOF

(71) Applicant: MITSUBISHI ELECTRIC CORPORATION, Tokyo (JP)

(72) Inventors: Junya Ujiie, Tokyo (JP); Kentaro Seki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/048,201

(22) PCT Filed: Jul. 6, 2018

(86) PCT No.: PCT/JP2018/025681
§ 371 (c)(1),
(2) Date: Oct. 16, 2020

(87) PCT Pub. No.: WO2020/008619
PCT Pub. Date: Jan. 9, 2020

(65) Prior Publication Data
US 2021/0157437 A1 May 27, 2021

(51) Int. Cl.
*G06F 3/0362* (2013.01)
*G06F 3/041* (2006.01)
*G06F 3/0488* (2013.01)

(52) U.S. Cl.
CPC ......... *G06F 3/0416* (2013.01); *G06F 3/0362* (2013.01); *G06F 3/04886* (2013.01)

(58) Field of Classification Search
CPC ... G06F 3/0362; G06F 3/0416; G06F 3/04886
See application file for complete search history.

(56) References Cited

U.S. PATENT DOCUMENTS

| 10,635,200 B1 * | 4/2020 | Lin ...................... G06F 3/0393 |
| 10,705,629 B1 * | 7/2020 | Arnold .................... G06F 3/044 |
| 2011/0130200 A1 | 6/2011 | Terada et al. |

(Continued)

FOREIGN PATENT DOCUMENTS

| JP | 2011-135562 A | 7/2011 |
| JP | 2012-35782 A | 2/2012 |

(Continued)

OTHER PUBLICATIONS

International Search Report, issued in PCT/JP2018/025681, PCT/ISA/210, dated Aug. 21, 2018.

(Continued)

*Primary Examiner* — Ryan A Lubit
(74) *Attorney, Agent, or Firm* — Birch, Stewart, Kolasch & Birch, LLP.

(57) ABSTRACT

It is an object to provide a technique allowing for enhancement of operability. A display device with a touch panel includes a display having a display screen to display a screen component, a touch panel disposed on the display screen of the display, and an operation determination unit. The operation determination unit disables detection by the touch panel of rotation operation on a knob or of touch operation on a related screen component that is the screen component related to an item to be operated by the rotation operation.

5 Claims, 5 Drawing Sheets

(56) References Cited

U.S. PATENT DOCUMENTS

| | | | |
|---|---|---|---|
| 2013/0215029 A1* | 8/2013 | Comer, Jr. | G06F 3/016 |
| | | | 345/161 |
| 2016/0026262 A1* | 1/2016 | Pesonen | G06F 3/0488 |
| | | | 345/174 |
| 2018/0024649 A1* | 1/2018 | Uno | G06F 3/0416 |
| | | | 345/174 |
| 2018/0032213 A1* | 2/2018 | Touyama | G06F 3/0487 |
| 2018/0074693 A1* | 3/2018 | Jones | G06F 1/169 |
| 2018/0154774 A1* | 6/2018 | Park | G02B 27/0101 |
| 2018/0370365 A1* | 12/2018 | Lee | G06F 3/0482 |
| 2020/0081557 A1* | 3/2020 | Togashi | G06F 3/0393 |
| 2020/0189392 A1* | 6/2020 | Sung | G09G 5/373 |

FOREIGN PATENT DOCUMENTS

| | | |
|---|---|---|
| JP | 2016-162132 A | 9/2016 |
| JP | 2017-27284 A | 2/2017 |
| WO | WO 2016/166793 A1 | 10/2016 |

OTHER PUBLICATIONS

Japanese Office Action for Japanese Application No. 2020-528648, dated Feb. 2, 2021, including an English translation.

* cited by examiner

DISPLAY DEVICE WITH TOUCH PANEL, AND OPERATION DETERMINATION METHOD THEREOF

TECHNICAL FIELD

The present invention relates to display devices with touch panels and operation determination methods thereof.

BACKGROUND ART

Various techniques have recently been proposed for a display device with a touch panel. For example, a display device with a touch panel on which a knob as a physical rotary operator is disposed to enable direct rotation operation on a display screen is proposed.

In such a display device with a touch panel, a finger of an operator with which a knob is pinched can unintentionally be in contact with a touch panel when rotation operation is being performed on the knob. This causes a problem in that, as a result of the contact being detected as touch operation on a screen component, such as an icon, operation not intended by the operator is performed by the device.

As a technique to solve the problem, Patent Document 1 proposes a technique of disabling touch operation on a touch panel as a whole excluding a knob disposition region or on a region around the knob disposition region when rotation operation on a knob is being detected.

PRIOR ART DOCUMENT

Patent Document

Patent Document 1: Japanese Patent Application Laid-Open No. 2012-35782

SUMMARY

Problem to be Solved by the Invention

Disablement of the touch operation on the touch panel as a whole excluding the knob disposition region, however, does not allow for touch operation on a screen component irrelevant to the knob, and reduces operability. Disablement of the touch operation on the region around the knob disposition region still causes a problem in that touch operation not intended by the operator is reflected in operation of the device depending on a size of the region on which the touch operation is disabled.

The present invention has been conceived in view of a problem as described above, and it is an object to provide a technique allowing for enhancement of operability.

Means to Solve the Problem

A display device with a touch panel according to the present invention includes a display having a display screen to display a screen component; and the touch panel disposed on the display screen of the display, wherein a knob rotatable relative to the touch panel is capable of being disposed on the touch panel to protrude on an opposite side to a side of the display screen, and the touch panel is capable of detecting touch operation on the touch panel and rotation operation on the knob, and the display device with the touch panel further includes an operation determination unit to disable detection by the touch panel of the rotation operation on the knob or of the touch operation on a related screen component that is the screen component related to an item to be operated by the rotation operation.

Effects of the Invention

According to the present invention, detection by the touch panel of the rotation operation on the knob or of the touch operation on the related screen component that is the screen component related to the item to be operated by the rotation operation is disabled. Such a configuration can enhance operability.

The objects, features, aspects, and advantages of the present invention will become more apparent from the following detailed description and the accompanying drawings.

DESCRIPTION OF EMBODIMENTS

Embodiment 1

Figure 1:
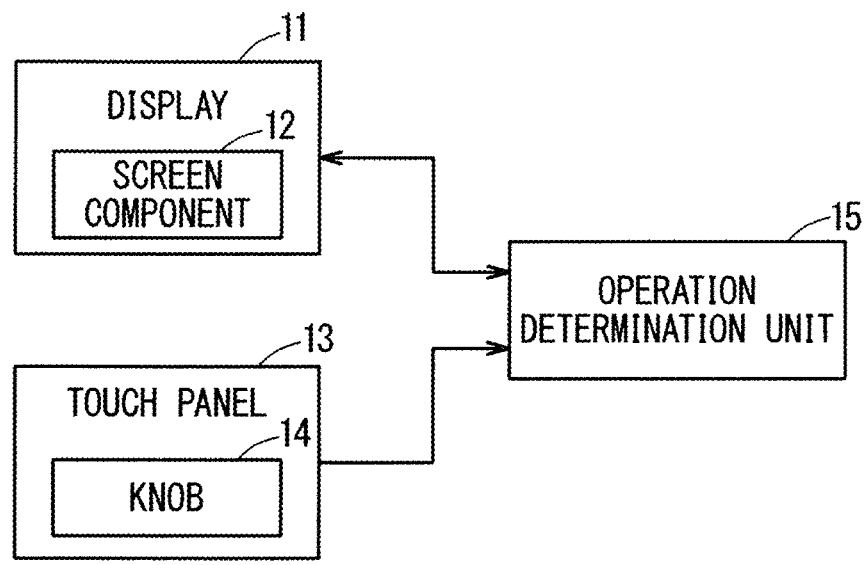
FIG. 1 is a block diagram showing a configuration of a display device with a touch panel according to Embodiment 1.

FIG. 1 is a block diagram showing a configuration of a display device 1 with a touch panel according to Embodiment 1 of the present invention. Description will be made below based on the assumption that the display device 1 with the touch panel is included in a navigation apparatus, but the display device 1 with the touch panel may not be included in the navigation apparatus, and may be included, for example, in a mobile terminal, such as a mobile phone, a smartphone, and a tablet.

The display device 1 with the touch panel in FIG. 1 includes a display 11, a touch panel 13, and an operation determination unit 15.

The display 11 has a display screen to display a screen component 12, such as an icon. Examples of the screen component 12 include a button, a gauge, a panel, and a text block. The display 11 is a display device, such as a liquid crystal display.

The touch panel 13 is disposed on the display screen of the display 11, and can detect touch operation on the touch panel 13. The touch panel 13 is, for example, a capacitive touch panel.

Figure 2:
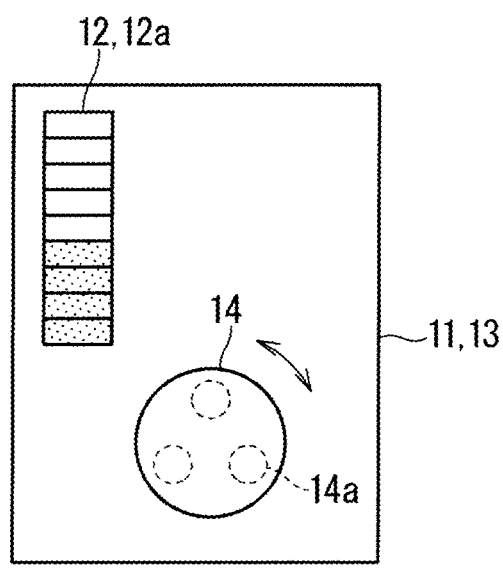
FIG. 2 is a plan view illustrating the display device with the touch panel according to Embodiment 1.

FIG. 2 is a plan view illustrating the display device 1 with the touch panel according to Embodiment 1. A knob 14 is rotatable relative to the touch panel 13, and can be disposed on the touch panel 13 to protrude on an opposite side to a side of the display screen of the display 11. The knob 14 includes conductive contacts 14a, such as terminals, spaced from a rotation axis of the knob 14, and the touch panel 13 can detect locations of the conductive contacts 14a as with a touch location of the touch operation. The touch panel 13 can thereby detect rotation of the conductive contacts 14a as rotation operation on the knob 14. As described above, the knob 14 can be disposed on the touch panel 13, and is attachable to and detachable from the touch panel 13, for example. The rotation operation on the knob 14 is hereinafter also referred to as "knob rotation operation".

The operation determination unit 15 determines whether or not the touch panel 13 has detected the knob rotation operation. The operation determination unit 15 also determines whether or not the touch panel 13 has detected the touch operation on the screen component 12 based on the touch location of the touch operation detected by the touch panel 13 and a location of the screen component 12 displayed by the display 11.

In Embodiment 1, the operation determination unit 15 disables detection by the touch panel 13 of the knob rotation operation or of touch operation on a related screen component that is the screen component 12 related to an item to be operated by the knob rotation operation. That is to say, when determining that the touch panel 13 has detected the knob rotation operation, the operation determination unit 15 disables detection by the touch panel 13 of the touch operation on the related screen component. On the other hand, when determining that the touch panel 13 has detected the touch operation on the related screen component, the operation determination unit 15 disables detection by the touch panel 13 of the knob rotation operation.

The screen component 12 for the item which is operated by the touch operation thereon and is the same as the item to be operated by the rotation operation on the knob 14 is applied to a related screen component 12a in an example of FIG. 2. When the item to be operated by the knob rotation operation is a sound volume, for example, the related screen component 12a may be the screen component 12 as a gauge for the sound volume to be operated by the touch operation thereon. When the item to be operated by the knob rotation operation is a map scale, for example, the related screen component 12a may be the screen component 12 as a gauge for the map scale to be operated by the touch operation thereon. When the item to be operated by the knob rotation operation is movement of a selection cursor for content playback and the like, for example, the related screen component 12a may be the screen component 12 as a button and the like, which are not illustrated, for movement of the selection cursor to be operated by the touch operation thereon.

The screen component 12 to change, by the touch operation thereon, the item to be operated by the knob rotation operation may be applied to the related screen component 12a, although it is not illustrated. For example, the related screen component 12a may be the screen component 12 as a button and the like to switch, by the touch operation thereon, the item to be operated by the knob rotation operation from the sound volume to the map scale.

<Conclusion of Embodiment 1>

Figure 3:
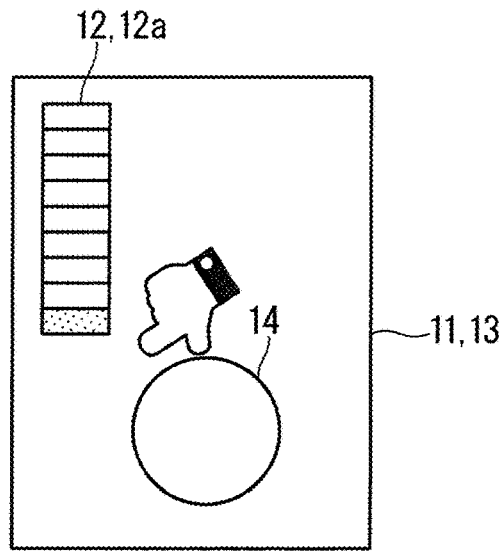
FIG. 3 is a plan view for describing an effect produced by the display device with the touch panel according to Embodiment 1.

According to the display device 1 with the touch panel according to Embodiment 1 described above, detection by the touch panel 13 of the rotation operation on the knob 14 or of the touch operation on the related screen component that is the screen component 12 related to the item to be operated by the rotation operation is disabled. According to such a configuration, when the rotation operation on the knob 14 is being performed to turn the sound volume up, for example, unintended touch operation on the screen component 12 for sound volume change to turn the sound volume down can be suppressed. That is to say, transition from a state in FIG. 2 to a state in FIG. 3 can be suppressed.

As described above, according to the display device 1 with the touch panel according to Embodiment 1, reflection of the touch operation or the rotation operation not intended by the operator in operation of the device can be suppressed to enhance operability. Touch operation on any screen component other than the related screen component 12a is enabled, so that reduction in operability can be suppressed.

Embodiment 2

Figure 4:
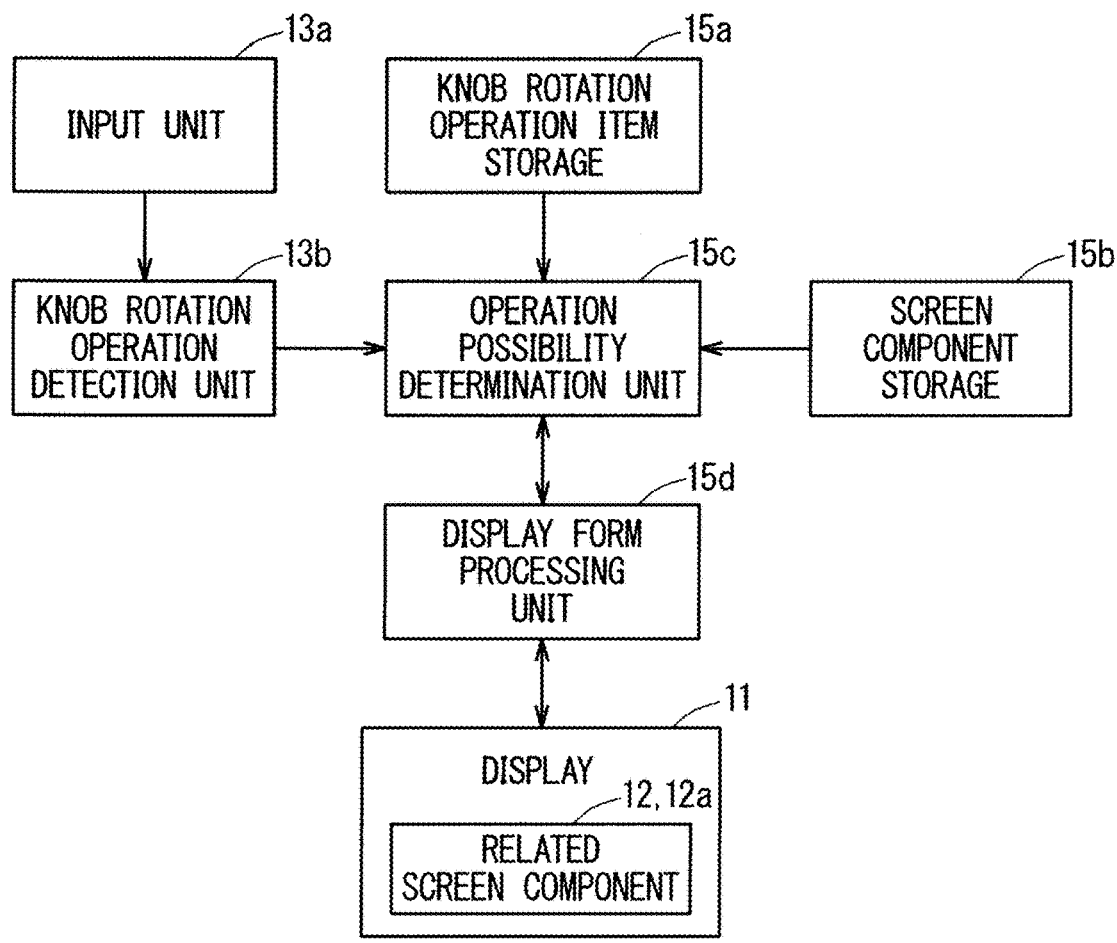
FIG. 4 is a block diagram showing a configuration of a display device with a touch panel according to Embodiment 2.

FIG. 4 is a block diagram showing a configuration of a display device 1 with a touch panel according to Embodiment 2 of the present invention. From among components according to Embodiment 2, identical or similar components to the above-mentioned components bear the same reference signs as those of the above-mentioned components, and different components will mainly be described below.

The display device 1 with the touch panel in FIG. 4 includes the display 11, an input unit 13a, a knob rotation operation detection unit 13b, a knob rotation operation item storage 15a, a screen component storage 15b, an operation possibility determination unit 15c, and a display form processing unit 15d. The input unit 13a and the knob rotation operation detection unit 13b correspond to the touch panel 13 in FIG. 1, and the knob rotation operation item storage 15a, the screen component storage 15b, the operation possibility determination unit 15c, and the display form processing unit 15d correspond to the operation determination unit 15 in FIG. 1.

The display 11 is substantially the same as the display 11 in Embodiment 1. The input unit 13a can detect the touch operation. The knob rotation operation detection unit 13b can detect the knob rotation operation.

The item to be operated by the rotation operation on the knob 14 is defined in advance per display content displayed on the display screen. The item to be operated by the rotation operation on the knob 14 is stored in the knob rotation operation item storage 15a per display content. Examples of the item include the sound volume, the map scale, and movement of the selection cursor.

The screen component 12 is defined in advance per display content displayed on the display screen. The screen component 12, the item to be operated by the touch operation on the screen component 12, and a transition state of the display screen including current display content and the like are stored in the screen component storage 15b per display content.

The operation possibility determination unit 15c determines whether or not the touch panel 13 has detected the knob rotation operation based on a result of detection by the knob rotation operation detection unit 13b. When determining that the knob rotation operation has been detected, the operation possibility determination unit 15c acquires, from the knob rotation operation item storage 15a, the item to be operated by the knob rotation operation corresponding to the current display content stored in the screen component storage 15b.

The operation possibility determination unit 15c then acquires, from the screen component storage 15b, the screen component 12 for the item which is operated by the touch operation thereon and is the same as the item acquired from the knob rotation operation item storage 15a as the related screen component 12a. The operation possibility determination unit 15c also acquires, from the screen component storage 15b, the screen component 12 to change, by the touch operation thereon, the item to be operated by the knob rotation operation as the related screen component 12a. The operation possibility determination unit 15c disables detection by the touch panel 13 of the touch operation on the related screen component 12a.

The screen component 12 for the item which is operated by the touch operation thereon and is the same as the item to be operated by the rotation operation on the knob 14 is hereinafter also referred to as an "item identical component 12b". In Embodiment 2, the related screen component 12a includes the item identical component 12b and the screen component 12 to change, by the touch operation thereon, the item to be operated by the knob rotation operation.

The display form processing unit 15d causes a display form of the item identical component 12b and a display form of a plurality of screen components 12 other than the item identical component 12b to be different. For example, the display form processing unit 15d changes the display form of the item identical component 12b to a grayed out, translucent, or border-highlighted display form without changing the display form of the plurality of screen components 12 other than the item identical component 12b.

By the function of the display form processing unit 15d, the display 11 displays the item identical component 12b (the screen component 12 for the item which is operated by the touch operation thereon and is the same as the item to be operated by the rotation operation on the knob 14) and the plurality of screen components 12 other than the item identical component 12b in different display forms. In an example of FIG. 5, the item identical component 12b is displayed in the grayed out display form, and the plurality of screen components 12 other than the item identical component 12b are displayed in a normal display form.

<Operation>

Figure 6:
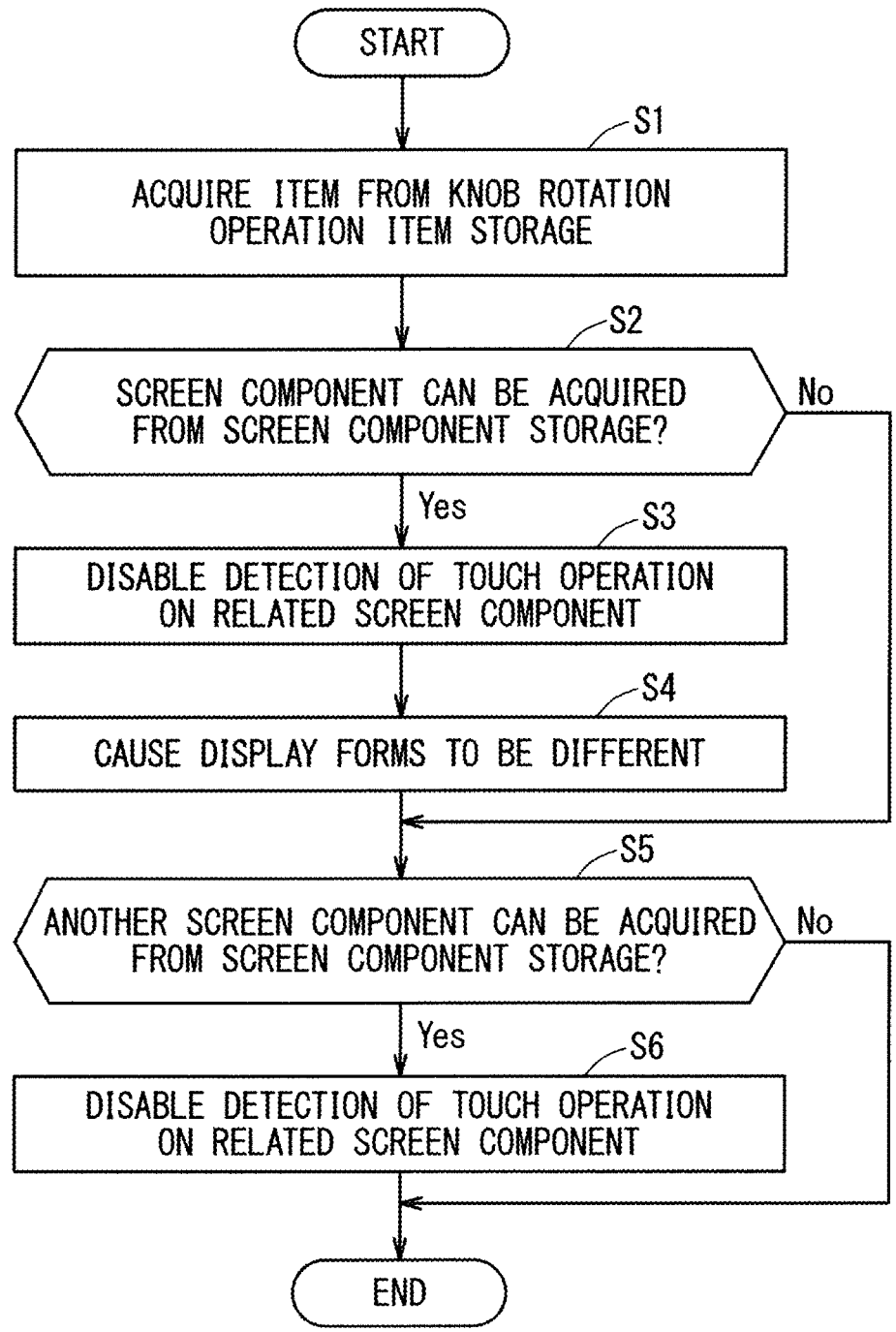
FIG. 6 is a flowchart showing operation of the display device with the touch panel according to Embodiment 2.

FIG. 6 is a flowchart showing operation of the display device 1 with the touch panel according to Embodiment 2. The operation shown in FIG. 6 starts upon detection of the knob rotation operation.

In a step S1, the operation possibility determination unit 15c acquires the item to be operated by the knob rotation operation corresponding to the current display content from the knob rotation operation item storage 15a.

In a step S2, the operation possibility determination unit 15c determines whether or not the screen component 12 displayed by the display 11 for the item which is operated by the touch operation thereon and is the same as the item acquired in the step S1 can be acquired from the screen component storage 15b. Processing proceeds to a step S3 when it is determined that the screen component 12 can be acquired, and proceeds to a step S5 when it is determined that the screen component 12 cannot be acquired.

In the step S3, by using the screen component 12 determined in the step S2 to be able to be acquired from the screen component storage 15b as the related screen component 12a, the operation possibility determination unit 15c disables detection by the touch panel 13 of the touch operation on the related screen component 12a. When there are a plurality of related screen components 12a, the operation possibility determination unit 15c disables detection by the touch panel 13 of the touch operation on each of the plurality of related screen components 12a.

In a step S4, by using the screen component 12 determined in the step S2 to be able to be acquired from the screen component storage 15b as the item identical component 12b, the display form processing unit 15d causes the display form of the item identical component 12b and the display form of the plurality of screen components 12 other than the item identical component 12b to be different. Processing then proceeds to the step S5.

In the step S5, the operation possibility determination unit 15c determines whether or not another screen component 12 to change, by the touch operation thereon, the item to be operated by the knob rotation operation can be acquired from the screen component storage 15b. Processing proceeds to a step S6 when it is determined that the screen component 12 can be acquired, and the operation in FIG. 6 ends when it is determined that the screen component 12 cannot be acquired.

In the step S6, by using the screen component 12 determined in the step S5 to be able to be acquired from the screen component storage 15b as the related screen component 12a, the operation possibility determination unit 15c disables detection by the touch panel 13 of the touch operation on the related screen component 12a. When there are a plurality of related screen components 12a, the operation possibility determination unit 15c disables detection by the touch panel 13 of the touch operation on each of the plurality of related screen components 12a. The operation in FIG. 6 then ends. Disablement in each of the step S3 and the step S6 may be canceled when a certain period of time has elapsed since detection of the knob rotation operation.

<Conclusion of Embodiment 2>

According to the display device 1 with the touch panel according to Embodiment 2 described above, operability can be enhanced as in Embodiment 1. According to Embodiment 2, the item identical component 12b and the plurality of screen components 12 other than the item identical component 12b are displayed in different display forms. The operator can thus easily identify any screen component 12 as the item identical component 12b before operation.

<Modification 1>

In the step S5 in FIG. 6, the operation possibility determination unit 15c may determine whether or not the screen component 12 to change, by the touch operation thereon, both the item to be operated by the knob rotation operation and the display content on the display screen can be acquired from the screen component storage 15b. When it is determined that the screen component 12 can be acquired, processing in the step S6 and processing to change the display content may be performed. In this case, when display content after the change includes a plurality of items to be operated by the knob rotation operation, an item set to the display content before the change may be set to the display content after the change.

<Modification 2>

Figure 7:
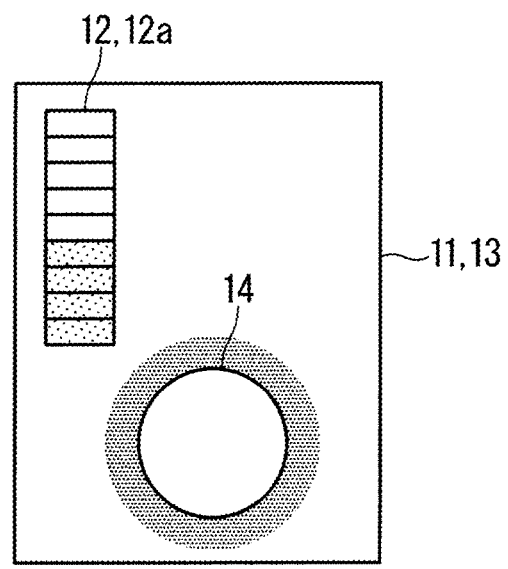
FIG. 7 is a plan view illustrating a display device with a touch panel according to Modification 2.

The operation possibility determination unit 15c disables detection by the touch panel 13 of the touch operation on the related screen component 12a in Embodiment 2, but operation whose detection is disabled is not limited to the touch operation on the related screen component 12a. For example, as described in Embodiment 1, the operation possibility determination unit 15c may disable detection by the touch panel 13 of the rotation operation on the knob 14, In this case, the display 11 may display a region in which the knob 14 is disposed and a region around the region in a display form different from the normal display form as illustrated in FIG. 7.

<Modification 3>

Figure 5:
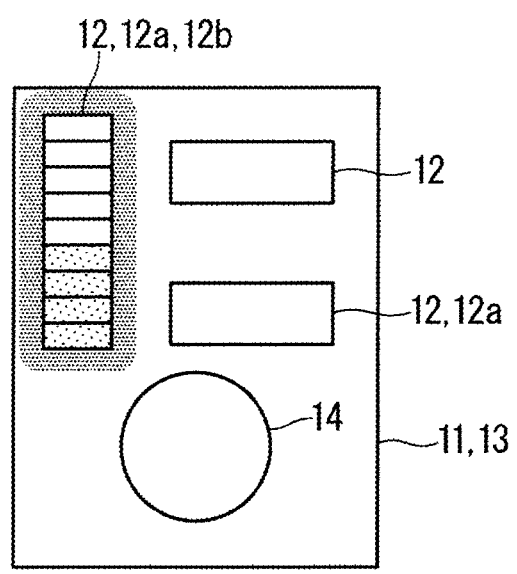
FIG. 5 is a plan view illustrating the display device with the touch panel according to Embodiment 2.

In Embodiment 2, the display 11 displays the item identical component 12*b* and the plurality of screen components 12 other than the item identical component 12*b* in different display forms (FIG. 5). In this case, the display 11 may additionally display characters indicating the item to be operated by the knob rotation operation. Furthermore, the display 11 may display the region in which the knob 14 is disposed, the region around the region, and a border of the item identical component 12*b* in the same color, and may also display a line connecting them.

<Other Modifications>

Figure 8:
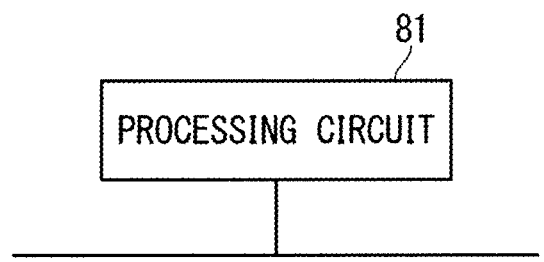
FIG. 8 is a block diagram showing a hardware configuration of an operation determination unit according to another modification.

The above-mentioned operation determination unit 15 in FIG. 1 is achieved by a processing circuit 81 shown in FIG. 8. That is to say, the processing circuit 81 includes the operation determination unit 15 to disable detection by the touch panel 13 of the knob rotation operation or of the touch operation on the related screen component 12*a* that is the screen component 12 related to the item to be operated by the knob rotation operation. Dedicated hardware may be applied or a processor to execute a program stored in memory may be applied to the processing circuit 81. Examples of the processor include a central processing unit, a processing unit, an arithmetic unit, a microprocessor, a microcomputer, and a digital signal processor (DSP).

When the processing circuit 81 is the dedicated hardware, the processing circuit 81 is, for example, a single circuit, a composite circuit, a programmed processor, a parallel-programmed processor, an application specific integrated circuit (ASIC), a field programmable gate array (FPGA), or a combination of them. Functions of the operation determination unit 15 may be achieved by circuits obtained by distributing the processing circuit, and functions of each unit may collectively be achieved by a single processing circuit.

Figure 9:
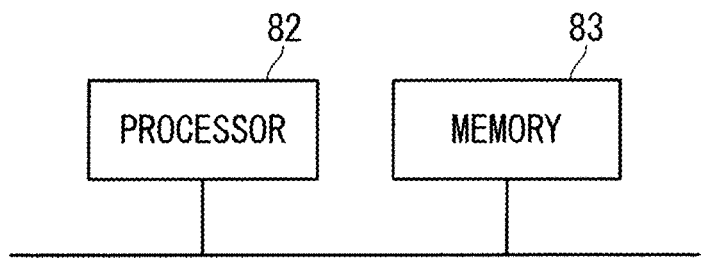
FIG. 9 is a block diagram showing the hardware configuration of the operation determination unit according to the other modification.

When the processing circuit 81 is the processor, the functions of the operation determination unit 15 are achieved by a combination of the processor and software and the like. The software and the like are, for example, software, firmware, or software and firmware. The software and the like are described as the program, and stored in the memory. As shown in FIG. 9, the functions of the operation determination unit 15 are achieved by a processor 82 applied to the processing circuit 81 reading and executing a program stored in memory 83. That is to say, the display device 1 with the touch panel includes the memory 83 for storing the program which, when executed by the processing circuit 81, results in performance of a step of disabling detection by the touch panel 13 of the knob rotation operation or of the touch operation on the related screen component 12*a* that is the screen component 12 related to the item to be operated by the knob rotation operation. In other words, it can be said that the program causes a computer to perform procedures or methods of the operation determination unit 15. The memory 83 is herein nonvolatile or volatile semiconductor memory, such as random access memory (RAM), read only memory (ROM), flash memory, erasable programmable read only memory (EPROM), and electrically erasable programmable read only memory (EEPROM), a hard disk drive (HDD), a magnetic disk, a flexible disk, an optical disc, a compact disc, a mini disc, a digital versatile disc (DVD), a drive device thereof, or any storage medium to be used in the future.

A configuration in which the functions of the operation determination unit 15 are achieved by the hardware or the software and the like has been described above. The configuration, however, is not limited to this configuration, and a configuration in which a part of the operation determination unit 15 is achieved by the dedicated hardware, and another part of the operation determination unit 15 is achieved by the software and the like may be used. As described above, the processing circuit 81 can achieve the above-mentioned functions by the hardware, the software and the like, or a combination of them.

Embodiments and modifications of the present invention can freely be combined with each other, and can be modified or omitted as appropriate within the scope of the invention.

While the invention has been described in detail, the foregoing description is in all aspects illustrative and not restrictive. It is understood that numerous modifications not having been described can be devised without departing from the scope of the present invention.

EXPLANATION OF REFERENCE SIGNS

1 display device with touch panel, 11 display, 12 screen component, 12*a* related screen component, 13 touch panel, 14 knob, 15 operation determination unit.

The invention claimed is:

1. A display device with a touch panel, the display device comprising:
a display having a display screen to display a screen component; and
the touch panel disposed on the display screen of the display, wherein
a knob rotatable relative to the touch panel is capable of being disposed on the touch panel to protrude on an opposite side to a side of the display screen, and the touch panel is capable of detecting touch operation on the touch panel and rotation operation on the knob, and
the display device with the touch panel further includes
a processing circuitry configured to disable detection by the touch panel of the touch operation on a related screen component that is the screen component related to an item to be operated by the rotation operation when the touch panel detects the knob rotation operation, and configured to disable detection by the touch panel of the rotation operation on the knob when the touch panel detects the touch operation on the related screen component.

2. The display device with the touch panel according to claim 1, wherein
the related screen component includes the screen component for the item which is operated by the touch operation thereon and is the same as the item to be operated by the rotation operation on the knob.

3. The display device with the touch panel according to claim 2, wherein
the display displays a plurality of screen components, and
the display displays the screen component for the item which is operated by the touch operation thereon and is the same as the item to be operated by the rotation operation on the knob and a plurality of screen components other than the screen component in different display forms.

4. The display device with the touch panel according to claim 1, wherein
the related screen component includes the screen component to change, by the touch operation thereon, the item to be operated by the rotation operation on the knob.

5. An operation determination method of determining operation of a display device with a touch panel, the display device with the touch panel including a display having a display screen to display a screen component, so as to enable the touch panel to be disposed on the display screen of the display, the display device configured for use with a knob rotatable relative to the touch panel that is capable of being disposed on the touch panel to protrude on an opposite side to a side of the display screen, the touch panel being capable of detecting touch operation on the touch panel and rotation operation on the knob, the operation determination method comprising:

disabling detection by the touch panel of the touch operation on a related screen component that is the screen component related to an item to be operated by the rotation operation when the touch panel detects the knob rotation operation; and disabling detection by the touch panel of the rotation operation on the knob when the touch panel detects the touch operation on the related screen component.

* * * * *